(12) United States Patent
Kesler

(10) Patent No.: US 12,371,577 B2
(45) Date of Patent: *Jul. 29, 2025

(54) ULTRAVIOLET (UV) ABSORBING INKS AND FILMS

(71) Applicant: N.J. Solar & Safety Film LLC, Bedminster, NJ (US)

(72) Inventor: Cody Kesler, Bedminster, NJ (US)

(73) Assignee: N.J. Solar & Safety Film LLC, Bedminster, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,300

(22) Filed: Jun. 19, 2023

(65) Prior Publication Data

US 2023/0399530 A1 Dec. 14, 2023

Related U.S. Application Data

(63) Continuation of application No. 18/140,643, filed on Apr. 28, 2023.
(Continued)

(51) Int. Cl.
*C09D 11/03* (2014.01)
*A01M 29/06* (2011.01)
(Continued)

(52) U.S. Cl.
CPC ............. *C09D 11/03* (2013.01); *A01M 29/06* (2013.01); *A01M 29/32* (2013.01); *C08J 7/0427* (2020.01);
(Continued)

(58) Field of Classification Search
CPC .......... C09D 11/03; C09D 5/028; C09D 7/67; C09D 11/102; C09D 11/107; C09D 5/004;
(Continued)

(56) References Cited

U.S. PATENT DOCUMENTS 4,169,902 A * 10/1979 De Long ............... C08K 5/0058
427/136
9,862,835 B2 1/2018 Thottahil
(Continued)

FOREIGN PATENT DOCUMENTS

AT 522536 A1 11/2020
EP 1110450 B1 12/2000
(Continued)

OTHER PUBLICATIONS

English machine translation of JP-2003147250-A (Year: 2003).*
(Continued)

*Primary Examiner* — Bryan D. Ripa
*Assistant Examiner* — Jeffrey Eugene Barzach
(74) *Attorney, Agent, or Firm* — Gearhart Law LLC

(57) ABSTRACT

Ultraviolet (UV) absorbing inks and films for surfaces such as glass and/or plastic are provided that include patterns visible to avian eyes, but invisible to a human at least ten feet away. Such invention is aimed at reducing the number of window strikes that result in bird deaths. A formulation may include a binder, a carrier. A formulation may include a base configured to dissolve and solubilize the binder such that it can be applied to the carrier. A formulation may include at least one of an ultraviolet (UV)/visible (VIS) absorbing (UAC) component and a UV/VIS reflective (URC) component.

16 Claims, 6 Drawing Sheets

Related U.S. Application Data

(60) Provisional application No. 63/336,519, filed on Apr. 29, 2022.

(51) Int. Cl.
*A01M 29/32* (2011.01)
*C08J 7/04* (2020.01)
*C09D 5/02* (2006.01)
*C09D 7/40* (2018.01)
*C09D 11/102* (2014.01)
*C09D 11/107* (2014.01)

(52) U.S. Cl.
CPC .............. *C09D 5/028* (2013.01); *C09D 7/67* (2018.01); *C09D 11/102* (2013.01); *C09D 11/107* (2013.01); *C08J 2333/08* (2013.01); *C08J 2375/04* (2013.01)

(58) Field of Classification Search
CPC ......... C09D 7/61; A01M 29/06; A01M 29/32; C08J 7/0427; C08J 2333/08; C08J 2375/04; C08J 2367/02; C08J 2433/08; C08J 2475/04; C08J 7/046; G02B 5/206; G02B 5/208
See application file for complete search history.

(56) References Cited

U.S. PATENT DOCUMENTS

| | | | |
|---|---|---|---|
| 11,092,726 B1 * | 8/2021 | Wuillaume | ......... C03C 17/3417 |
| 2007/0044731 A1 | 3/2007 | Klem, Jr. | |
| 2007/0190343 A1 | 8/2007 | Arkles | |
| 2009/0075857 A1 * | 3/2009 | Jonke | ................ C11D 17/0026 510/337 |
| 2013/0087720 A1 * | 4/2013 | Cesnik | .................. A01M 29/08 250/461.1 |
| 2015/0033811 A1 * | 2/2015 | Sanders | ................... C05G 3/80 71/27 |
| 2015/0050505 A1 | 2/2015 | Arkles | |
| 2015/0375485 A1 | 12/2015 | Kuhlmann et al. | |
| 2016/0279002 A1 * | 9/2016 | Sauer | ................ A61F 13/51496 |
| 2016/0304701 A1 * | 10/2016 | Kakinuma | ........... C08K 5/3475 |
| 2016/0312053 A1 * | 10/2016 | Yano | ...................... C09D 11/10 |
| 2018/0002034 A1 | 1/2018 | Khawam | |
| 2019/0284426 A1 * | 9/2019 | Matsuzaki | ........... B41J 11/0022 |
| 2020/0174333 A1 * | 6/2020 | Mathew | .............. C03C 17/2456 |

FOREIGN PATENT DOCUMENTS

| | | | | |
|---|---|---|---|---|
| EP | 4032400 A1 | | 10/2022 | |
| JP | 2003147250 A | * | 5/2003 | |
| JP | 2012046675 A | * | 3/2012 | .............. C09D 4/00 |
| KR | 20210044338 A | * | 4/2021 | |
| WO | 2015181542 A1 | | 12/2015 | |
| WO | 2017079822 A1 | | 5/2017 | |
| WO | WO-2019223808 A1 | * | 11/2019 | .......... A41D 13/001 |
| WO | 2020225256 A1 | | 11/2020 | |
| WO | WO-2021115544 A1 | * | 6/2021 | ............ A01M 29/08 |
| WO | WO-2022130326 A1 | * | 6/2022 | ................ D06P 1/00 |
| WO | WO-2023006543 A1 | * | 2/2023 | ....... B32B 17/10045 |

OTHER PUBLICATIONS

English machine translation of JP-2012046675-A (Year: 2012).*
English machine translation of KR-20210044338-A (Year: 2021).*
English machine translation of WO-2019223808-A1 (Year: 2019).*
PCT Search Report and Written Opinion; issued Jan. 9, 2024, International App No. PCT/US23/20514 (17 pages).
Daniel Klem, Jr., "Preventing Bird-Window Collisions," The Wilson Journal of Ornithology, 2009, 121(2), pp. 314-321, doi: 10.1676/08-118.1.
Lavana Pilla, et al., "Save Birdlife: A Novel Deep Learning method for Detecting and Automatically Diversifying Birds from the Window Glass," 2021 International Conference on Advance Computing and Innovative Technologies in Engineering (ICACITE), 2021, pp. 339-342, doi: 10.1109/ICACITE51222.2021.9404610.

* cited by examiner

ULTRAVIOLET (UV) ABSORBING INKS AND FILMS

CROSS-REFERENCE TO RELATED APPLICATIONS

This application is a Continuation U.S. Non-Provisional Patent Application entitled "ULTRAVIOLET (UV) ABSORBING INKS AND FILMS" which claims priority to co-pending U.S. Non-Provisional patent application Ser. No. 18/140,643 filed on Apr. 28, 2023,entitled "ULTRAVIOLET (UV) ABSORBING INKS AND FILMS", which claims priority to U.S. Provisional Patent Application No. 63/336,519 filed Apr. 29, 2022, entitled, "ULTRAVIOLET (UV) ABSORBING INKS AND FILMS FOR GLASS", the entire contents of which are hereby incorporated by reference in their entirety.

FIELD OF THE INVENTION

The field of this invention relates to systems and methods for creating and utilizing ultraviolet (UV) absorbing inks and films for glass that provide a pattern that is visible to avian eyes, but is invisible to a human from at least ten feet away.

BACKGROUND OF THE EMBODIMENTS

Window strikes are among the top three human-related cause of bird deaths, along with cats and habitat destruction. Up to one billion birds die each year in the United States due to collisions with windows and research shows that about 54-76% of window collisions are fatal. See, Lavana Pilla, et al., "Save Birdlife: A Novel Deep Learning method for Detecting and Automatically Diversifying Birds from the Window Glass," 2021 International Conference on Advance Computing and Innovative Technologies in Engineering (ICACITE), 2021, pp. 339-342, doi: 10.1109/ICACITE51222.2021.9404610, the entire contents of which are hereby incorporated by reference in their entirety. In fact, birds sometimes do not perceive windows as a barrier. Instead, reflections in glass look to them as open areas, so they fly directly into the glass-window. The absence of depth perception may contribute to the birds false belief that the reflection they have seen is a bird belonging to their habitat. However, these bird deaths are foreseeable and avoidable.

Some methods exist to create a pattern on sheet or flat pane glass and plastic that are invisible to the normal human eye when the human is at least ten feet away, but will be visible to the avian eye if created using UV reflectance or absorption in the UV-A wavelength range of 315 nm to 380 nm and 380 nm to less than (<) 400 nm. Methods using UV signals to alert birds to window hazards should have special utility because they offer visual cues in wavelengths that birds are known to see, but humans do not. See, Daniel Klem, Jr., "Preventing Bird-Window Collisions," The Wilson Journal of Ornithology, 2009, 121(2), Pages 314-321, doi: 10.1676/08-118.1, the entire contents of which are hereby incorporated by reference in their entirety.

A first known method to create such protective patterns on a transparent/clear surface includes creating a pattern by reflecting or absorbing UV in the avian visual range, which is invisible to a human from at least ten feet away. Specifically birds' vision is tetrachromatic and most birds have long-, medium-, and short-wavelength cones similar to those of humans, but in addition, they have a cone type enabling them to detect wavelengths in the near ultraviolet range (e.g., between about 300 nm to 400 nm). Further, the coatings are molecularly bonded or adhered by other means and are an integral part of the glass and plastic surface.

A second known method includes adding translucent or frosted elements in a pattern on a solid or laminated pane or panes if the glass or plastic are transparent. The translucent or frosted elements may be applied onto an outside surface of the glass or plastic by acid etching, sand blasting, ceramic frit technique involving temperatures in excess of about 648.9° C., or any other means.

A third method includes creating a pattern on a one-way glass or plastic by using coatings as a permanent integral part of the glass or plastic surface or as external non-permanent films. In other examples, nanoparticle technology is used, where the nanoparticles that create the pattern are an integral part of the sheet or flat pane glass or plastic.

The instant invention provides an enhanced solution over other known solutions in the underlying technical field. Specifically, the present invention provides UV absorbing inks and films for glass that provide a pattern that is visible to avian eyes, but is invisible to a human from at least ten feet away.

SUMMARY OF THE EMBODIMENTS

The present invention and its embodiments relate to systems and methods for creating and utilizing ultraviolet (UV) absorbing inks and films for a surface such as glass and/or plastic that a pattern that is visible to avian eyes, but is invisible to a human from at least ten feet away.

A first embodiment of the present invention describes a formulation applied to a glass or a plastic in a pattern that is visible to avian eyes. The composition is applied to the glass or the plastic by a method such as: a gravure method, an offset-gravure method, an enclosed doctor blade method, a multi-roll method, a dip method, a spray method, a Mayer rod method, or a knife over roll method, among other methods not explicitly listed herein.

The formulation includes a binder configured to bind components together, where the binder is an acrylic, a polyurethane, a polyester, a polyether, a silicone, a fluoropolymer, a polyisobutylene (PIB), an ethylene vinyl acetate (EVA), an ethylene acrylic acid (EAA), a natural rubber, and/or a synthetic rubber, among others not explicitly listed herein. The formulation also includes a carrier that supports the formulation and assists in the application of the formulation to the glass or the plastic. The carrier contributes to at least one of optical quality, UV light transmission, VIS light transmission, and a physical appearance of the formulation on the glass or plastic. Further, the carrier may be a substrate, such as an acetate, an acrylic, a polyvinyl chloride (PVC), a polyester, or a polyurethane film, among others not explicitly listed herein.

The formulation also includes a base configured to dissolve and solubilize the binder such that it can be applied to the carrier. The base may be a monomer, a solvent, a solid system, a solventless system, or an aqueous system, among others not explicitly listed herein.

The formulation further includes an ultraviolet (UV)/visible (VIS) absorbing (UAC) component and/or a UV/VIS reflective (URC) component. The UAC component comprises an organic component, an inorganic component, or a blend of organic and inorganic components. Further, the UAC component provides absorption in a range of about 400 nm to about 450 nm. In examples, the UAC component includes metal oxides, metal nanoparticles, organic nanoparticles, organometallic nanoparticles, benzotriazoles, triazines, benzophenones, hindered amine light stabilizers (HALS), primary antioxidants, dyes, metal complex absorbing dyes, Tinuvin® CarboProtect®, Tinuvin® 477, Tinuvin® 1030, Tinuvin® 292, or Tinuvin® 123, among others not explicitly listed herein. The URC component comprises nanoparticles having a size in a range of about 0.50 nm to about 1000 nm. Moreover, the nanoparticles make up about 0.25 wt. % to about 10 wt. % based on a total coating or adhesive solids.

In some examples, the formulation may also include at least one additive component. The at least one additive component may be a wetting aid, a defoamer, a rheology modifier, a humectant, a plasticizer, a tackifier, a filler, a pigment, a dye, a matting agent, an inhibitors, or a stabilizer, among others not explicitly listed herein. The binder is also configured to hold the at least one additive component in place.

In other examples, the formulation may further include a crosslinking component, such as a peroxide, an azo, an aziridine, an isocyanate, a polyol, a thiol, a titanate, a zirconate, a metal oxide, or a metal acetylacetonate, among others not explicitly listed herein.

Another embodiment of the present invention describes a formulation applied to a glass or a plastic in a pattern that is visible to avian eyes. The formulation includes a base film or an ink that is optically clear and comprises a min of 410 nm or above and absorption at about 50% transmission. The formulation further includes an optically clear UV reflective ink at a wavelength of about 350 nm and above. In examples, the optically clear UV reflective ink is an inorganic ink. Moreover, the formulation comprises a matrix pattern of absorbing and reflective dots that are separated by about 2 inches or less from one another. The UV absorbing transmission of the formulation is between about 410 and 420 nm at about 50% light transmission.

In some aspects, the techniques described herein relate to a formulation applied to a glass or a plastic in a pattern that is visible to avian eyes, the formulation including: a binder configured to bind components together; a carrier that supports the formulation and assists in an application of the formulation to the glass or the plastic; a base configured to dissolve and solubilize the binder such that it can be applied to the carrier; and at least one of an ultraviolet (UV)/visible (VIS) absorbing (UAC) component and a UV/VIS reflective (URC) component.

In some aspects, the techniques described herein relate to a formulation, wherein the binder is selected from the group consisting of: an acrylic, a polyurethane, a polyester, a polyether, a silicone, a fluoropolymer, a polyisobutylene (PIB), an ethylene vinyl acetate (EVA), an ethylene acrylic acid (EAA), a natural rubber, and a synthetic rubber.

In some aspects, the techniques described herein relate to a formulation, wherein the base is selected from the group consisting of: a monomer, a solvent, a solid system, a solventless system, and an aqueous system.

In some aspects, the techniques described herein relate to a formulation, wherein the carrier contributes to at least one of optical quality, UV light transmission, VIS light transmission, and a physical appearance of the formulation on a surface of a material such as glass or plastic.

In some aspects, the techniques described herein relate to a formulation, wherein the carrier is a substrate; and wherein the substrate is selected from the group consisting of: an acetate, an acrylic, a polyvinyl chloride (PVC), a polyester, and a polyurethane film.

In some aspects, the techniques described herein relate to a formulation, further including: at least one additive component.

In some aspects, the techniques described herein relate to a formulation, wherein the at least one additive component is selected from the group consisting of: a wetting aid, a defoamer, a rheology modifier, a humectant, a plasticizer, a tackifier, a filler, a pigment, a dye, a matting agent, an inhibitors, and a stabilizer.

In some aspects, the techniques described herein relate to a formulation, wherein the binder is configured to hold the at least one additive component in place.

In some aspects, the techniques described herein relate to a formulation, further including: a crosslinking component.

In some aspects, the techniques described herein relate to a formulation, wherein the crosslinking component is selected from the group consisting of: a peroxide, an azo, an aziridine, an isocyanate, a polyol, a thiol, a titanate, a zirconate, a metal oxide, and a metal acetylacetonate.

In some aspects, the techniques described herein relate to a formulation, wherein the formulation is applied to a surface of glass and/or plastic by a method selected from the group consisting of: a gravure method, an offset-gravure method, an enclosed doctor blade method, a multi-roll method, a dip method, a spray method, a Mayer rod method, and a knife over roll method.

In some aspects, the techniques described herein relate to a formulation, wherein the UAC component includes an organic component, an inorganic component, or a blend of organic and inorganic components.

In some aspects, the techniques described herein relate to a formulation, wherein the UAC component provides absorption in a range of about 400 nm to about 450 nm.

In some aspects, the techniques described herein relate to a formulation, wherein the UAC component is selected from the group consisting of: metal oxides, metal nanoparticles, organic nanoparticles, organometallic nanoparticles, benzotriazoles, triazines, benzophenones, hindered amine light stabilizers (HALS), primary antioxidants, dyes, metal complex absorbing dyes, Tinuvin® CarboProtect®, Tinuvin® 477, Tinuvin® 1030, Tinuvin® 292, and Tinuvin® 123.

In some aspects, the techniques described herein relate to a formulation, wherein the URC component includes nanoparticles having a size in a range of about 0.50 nm to about 1000 nm.

In some aspects, the techniques described herein relate to a formulation, wherein the nanoparticles make up about 0.25 wt. % to about 10 wt. % based on a total coating or adhesive solids.

In some aspects, the techniques described herein relate to a formulation applied to a glass or a plastic in a pattern that is visible to avian eyes, the formulation including: a base film or an ink that is optically clear; an optically clear ultraviolet (UV) reflective ink at a wavelength of about 350 nm and above; and a matrix pattern of absorbing and reflective dots.

In some aspects, the techniques described herein relate to a formulation, wherein the base film or the ink includes a min of 410 nm or above and absorption at about 50% transmission.

In some aspects, the techniques described herein relate to a formulation, wherein the optically clear UV reflective ink is an inorganic ink.

In some aspects, the techniques described herein relate to a formulation, wherein the matrix pattern of the absorbing and reflective dots are separated by about 2 inches or less from one another.

In some aspects, the techniques described herein relate to a formulation, wherein a UV absorbing transmission is between about 410 and 420 nm at about 50% light transmission.

In some aspects, the techniques described herein relate to a coating composition including: a hollow silicon oxide having a size of about 20 nm; a fluorescent pigment or dye; and a scratch resistance (SR) coating.

Clause 1. A formulation applied to a glass or a plastic in a pattern that is visible to avian eyes, the formulation comprising: a binder configured to bind components together; a carrier that supports the formulation and assists in an application of the formulation to the glass or the plastic; a base configured to dissolve and solubilize the binder such that it can be applied to the carrier; and at least one of an ultraviolet (UV)/visible (VIS) absorbing (UAC) component and a UV/VIS reflective (URC) component.

Clause 2. The formulation of clause 1, wherein the binder is selected from the group consisting of: an acrylic, a polyurethane, a polyester, a polyether, a silicone, a fluoropolymer, a polyisobutylene (PIB), an ethylene vinyl acetate (EVA), an ethylene acrylic acid (EAA), a natural rubber, and a synthetic rubber.

Clause 3. The formulation of clause 1, wherein the base is selected from the group consisting of: a monomer, a solvent, a solid system, a solventless system, and an aqueous system.

Clause 4. The formulation of clause 1, wherein the carrier contributes to at least one of optical quality, UV light transmission, VIS light transmission, and a physical appearance of the formulation on the glass or the plastic.

Clause 5. The formulation of clause 1, wherein the carrier is a substrate; and wherein the substrate is selected from the group consisting of: an acetate, an acrylic, a polyvinyl chloride (PVC), a polyester, and a polyurethane film.

Clause 6. The formulation of clause 1, further comprising: at least one additive component.

Clause 7. The formulation of clause 6, wherein the at least one additive component is selected from the group consisting of: a wetting aid, a defoamer, a rheology modifier, a humectant, a plasticizer, a tackifier, a filler, a pigment, a dye, a matting agent, an inhibitors, and a stabilizer.

Clause 8. The formulation of clause 6, wherein the binder is configured to hold the at least one additive component in place.

Clause 9. The formulation of clause 1, further comprising: a crosslinking component.

Clause 10. The formulation of clause 9, wherein the crosslinking component is selected from the group consisting of: a peroxide, an azo, an aziridine, an isocyanate, a polyol, a thiol, a titanate, a zirconate, a metal oxide, and a metal acetylacetonate.

Clause 11. The formulation of clause 1, wherein the formulation is applied to the glass or the plastic by a method selected from the group consisting of: a gravure method, an offset-gravure method, an enclosed doctor blade method, a multi-roll method, a dip method, a spray method, a Mayer rod method, and a knife over roll method.

Clause 12. The formulation of clause 1, wherein the UAC component comprises an organic component, an inorganic component, or a blend of organic and inorganic components.

Clause 13. The formulation of clause 12, wherein the UAC component provides absorption in a range of about 400 nm to about 450 nm.

Clause 14. The formulation of clause 12, wherein the UAC component is selected from the group consisting of: metal oxides, metal nanoparticles, organic nanoparticles, organometallic nanoparticles, benzotriazoles, triazines, benzophenones, hindered amine light stabilizers (HALS), primary antioxidants, dyes, metal complex absorbing dyes, Tinuvin® CarboProtect®, Tinuvin® 477, Tinuvin® 1030, Tinuvin® 292, and Tinuvin® 123.

Clause 15. The formulation of clause 1, wherein the URC component comprises nanoparticles having a size in a range of about 0.50 nm to about 1000 nm.

Clause 16. The formulation of clause 15, wherein the nanoparticles make up about 0.25 wt. % to about 10 wt. % based on a total coating or adhesive solids.

Clause 17. A formulation applied to a glass or a plastic in a pattern that is visible to avian eyes, the formulation comprising: a base film or an ink that is optically clear; an optically clear ultraviolet (UV) reflective ink at a wavelength of about 350 nm and above; and a matrix pattern of absorbing and reflective dots.

Clause 18. The formulation of clause 17, wherein the base film or the ink comprises a min of 410 nm or above and absorption at about 50% transmission.

Clause 19. The formulation of clause 17, wherein the optically clear UV reflective ink is an inorganic ink.

Clause 20. The formulation of clause 17, wherein the matrix pattern of the absorbing and reflective dots are separated by about 2 inches or less from one another.

Clause 21. The formulation of clause 17, wherein a UV absorbing transmission is between about 410 and 420 nm at about 50% light transmission.

Clause 22. A coating composition comprising: a hollow silicon oxide having a size of about 20 nm; a fluorescent pigment or dye; and a SR coating.

DESCRIPTION OF THE PREFERRED EMBODIMENTS

Figure 1:
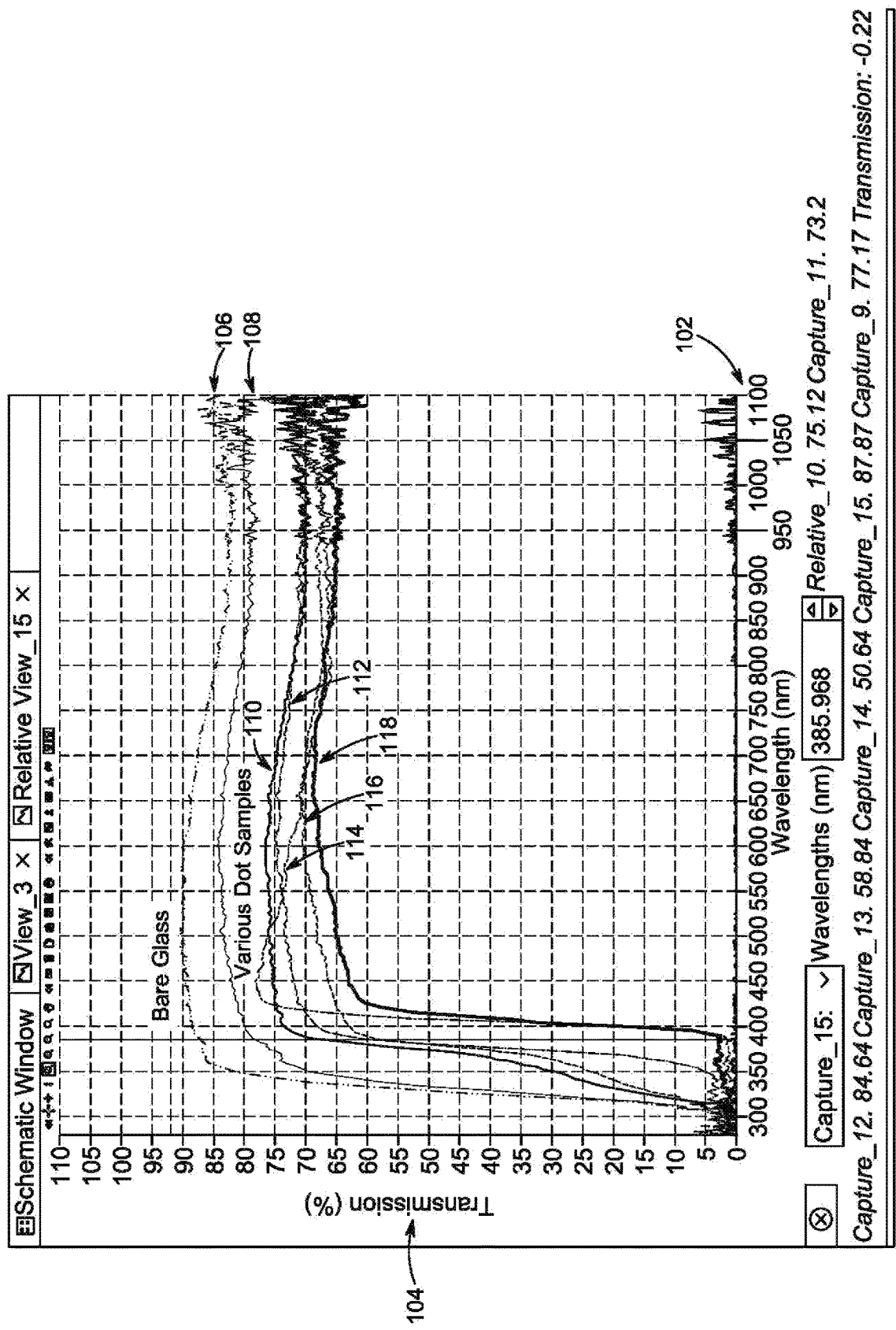
FIG. 1 depicts a graph resulting from an ultraviolet-visible (UV-VIS) spectroscopy method that plots wavelength against transmission for a bare glass and various samples, in accordance with embodiments of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

When the term "about" is used in conjunction with a numerical range, it modifies that range by extending the boundaries above and below those numerical values. In general, the term "about" is used herein to modify a numerical value above and below the stated value by a variance of 20%, 10%, 5%, or 1%. In certain embodiments, the term "about" is used to modify a numerical value above and below the stated value by a variance of 10%. In certain embodiments, the term "about" is used to modify a numerical value above and below the stated value by a variance of 5%. In certain embodiments, the term "about" is used to modify a numerical value above and below the stated value by a variance of 1%.

In general, the present invention describes an ink or film that is applied onto a glass or plastic in a pattern such that the ink or film is invisible to the human eye, but is visible to the avian eye. The pattern is invisible to a human from at least ten feet away. It should be appreciated that the glass may be an inorganic glass, and more specifically, a flat pane sheet glass. In examples, this pattern may be a matrix arrangement of absorbing and reflective dots or patterns that may uniformly cover an entire pane or sheet of flat glass and may be of any shape or size. In other examples, the patterns are separated by about 5 cm or less from one another and are arranged in horizontal rows, vertical columns, both horizontal rows and vertical columns, or any other parallel arrangement of elements with similar spacing and variously angled from either or both the horizontal row and vertical column orientation. The patterns serve to create a visual warning about the glass hazard in the environment. Specifically, birds avoid flying into patterned-type glasses and plastics, as the birds recognize the space that the glass occupies as a barrier to be avoided.

As described herein, the term "binder" refers to and includes any suitable binder that is an essential part of a coating or adhesive's makeup. Specifically, the binder holds the additives in place and binds all of the ingredients together. A non-exhaustive list of binders include: an acrylic, polyurethane, polyester, polyether, silicone, fluoropolymer, polyisobutylene (PIB), ethylene vinyl acetate (EVA), ethylene acrylic acid (EAA), and natural or synthetic rubbers, among others not explicitly listed herein. A non-exhaustive list of natural or synthetic rubbers include: styrene butadiene random copolymer (SBR) and styrene butadiene-styrene (SBS), styrene isoprene styrene (SIS), and styrene-ethylene-butylene-styrene block copolymer (SEBS), among others not explicitly listed herein.

As described herein, the term "base" refers to an any suitable monomer, solvent, or aqueous chemistry used to dissolve and solubilize the binder such that it can be applied to the carrier. The base may include a water-based system in which the binders are dissolved or dispersed in water. An example water-based chemistry useful to the present invention includes aliphatic polyurethane dispersions. Aliphatic polyurethane dispersions have very good wet out, optical clarity, adhesion, and outdoor weatherability.

In other examples, the base may also be solvent or a blend of solvents. Coating and adhesive systems applied by means of solvent-based formulation typically have the benefit of low surface energy, controlled drying, and can provide "bite" into the substrate of interest. These help improve flow and leveling, appearance, and bond to the substrate. Solvent-based formulations may comprise the binders discussed herein.

An example solvent-based chemistry useful to the present invention includes alkyd acrylic dissolved in a solvent, such as butyl or ethyl acetate. The solvent-based alkyd acrylic has excellent wet out, optical clarity, adhesion, and outdoor weatherability. The solvent may be any solvent that suitable dissolves the binder and other formulation ingredients and allows the product to be applied to the carrier of interest.

In other examples, the base can include 100% solid systems, such as ultraviolet light (UV), electron beam (EB) or solventless systems. These formulations contain little-to-no solvent or water. Binders are typically dissolved in functional monomer and/or oligomers. The functional monomers and/or oligomers act as diluents that control the viscosity of the final formulation and provide some physical performance. Specifically, UV/EB formulations typically consist of a blend of binder, monomer, oligomer, photoinitiator, and surfactant. Some or all of the binder, monomer, and oligomer contain reactive functional groups that cross-link the liquid formulation into a solid film when exposed to UV or EB. The functional groups may include, but are not limited to, (meth)acrylate, epoxy, vinyl, vinyl ether, thiol, and amine.

UV formulations consisting of aliphatic bind, monomer, and oligomer are particularly useful to the present invention as they possess very good physical performance, optical, and weatherability properties. The 100% solids base approach may also be a solventless system, which is exposed to air or heat to crosslink the liquid formulation into a solid film. Examples of solventless systems include, but are not limited to, one part (moisture cure) or two-part (isocyanate-alcohol) polyurethane, silicon hydride-vinyl silicones, room temperature vulcanization silicones, cationic cured epoxy, amine cured epoxy, and peroxide crosslinked binders.

As described herein, the term "carrier" refers to any suitable substrate to which formulations of the present invention can be applied. The carrier supports the coating or adhesive formulation and provides a means for the inventive article to be applied to the final structure. The carrier also possesses physical, optical, and weatherability properties consistent with the goals of the inventive article. The carrier may contribute to optical quality, UV or visible light transmission, and overall physical appearance of the inventive article on the final structure. Example carriers include substrates, such as acetate, acrylic, polyvinyl chloride (PVC), polyester, and polyurethane films, among others not explicitly listed herein.

As described herein, the term "additive" is used to refer to a component added to the coating or adhesive formulation of the present invention that assists with the coating, lay down, wet out, drying, and overall physical, optical, and weatherable properties of the inventive article. Examples of additives include, but are not limited to, wetting aids, defoamers, rheology modifiers, humectants, plasticizers, tackifiers, fillers, pigments, dyes, matting agents, inhibitors, and stabilizers.

As described herein, the term "crosslinker" is used to refer to any component added to the coating or adhesive formulation to link functional groups on the binders, monomer, or oligomers. Examples of crosslinkers include, but are not limited to, peroxides, azos, aziridines, isocyanates, polyols, thiols, titanates, zirconates, metal oxides, and metal acetylacetonates. In the case of a UV formulation, the crosslinking occurs when photoinitiators in the coating or adhesive absorb UV light, decompose to reactive species, and initiate crosslinking of the functional groups which builds the crosslink density. This transforms the liquid formulation to a solid film.

As described herein, the term "application" refers to any means for applying the liquid coating and adhesive formulations to the carrier. A non-exhaustive list of applications include: gravure, offset-gravure, enclosed doctor blade, multi-roll, dip, spray, Mayer rod, and knife over roll. It should be appreciated that the formulations are applied as a liquid to the surface of the substrate and when exposed to UV/visible (VIS) light, EB, or heat (IR, or forced air heat), the coating crosslinks into a solid film on the substrate.

As described herein, "UV/VIS absorbing component" or "UAC" refers to any component that absorbs UV and/or VIS light in such a way that meets the intended absorbing goals of the present invention. The UAC may be organic, inorganic, or a blend. When only organic UACs are used, combinations of different organic UACs may be used to achieve absorption at the desired wavelength range. The same is true when using only inorganic UACs. For the present invention, absorption in the range of about 400 nm to about 450 nm is desirable to achieve extremely low bird strike values.

A non-exhaustive list of examples of UACs include metal oxides, metal nanoparticles, organic nanoparticles, organometallic nanoparticles, benzotriazoles, triazines, benzophenones, hindered amine light stabilizers (HALS), primary antioxidants, and dyes, such as Cu(II) meso-Tetra(4-carboxyphenyl)porphine, among others not explicitly listed herein. A non-exhaustive list of commercial UACs include: Tinuvin® CarboProtect®, Tinuvin® 477, Tinuvin® 1030, Tinuvin® 292, and Tinuvin® 123 from BASF, among others not explicitly listed herein. Specifically, the Tinuvin® CarboProtect® is a UV absorber specifically developed to protect carbon fiber reinforced materials (CFRMs) and other UV-sensitive substrates from UV and near visible light. In some examples, the UAC may be metal complex absorbing dyes, such as ABS 400 through ABS 455 from Luxottica Exciton. It should be appreciated that the UACs loading can range from about 0.25% to about 30% by weight of total coating or adhesive solids.

As described herein, "UV/VIS reflective component" or "URC" refers to any suitable component that reflects UV and/or VIS light in such a way that meets the intended reflective goals of the present invention. In some examples, the URCs are nanoparticles with a size in a range of about 0.50 nm to about 1000 nm. Further, the nanoparticles make up about 0.25% to about 10% weight percent based on total coating or adhesive solids. An example nanoparticle may include nanoparticle silica. It should be appreciated that the nanoparticles may be incorporated into the coating and adhesive formulation as a solid powder or as a colloidal solution. Further, the nanoparticles may be solid or hollow. Additionally, the surface may be bare or surface-treated with polymers, waxes, silanes, zirconates, titanates, and/or metals, such as nickel, silver, aluminum, or gold. In additional examples, the nanoparticles may be hydrophobic or hydrophilic. When incorporating the nanoparticle silica into the coating or adhesive formulation as a colloidal solution, the solution may be acidic or alkaline. A commercial example of a nanometer silicon oxide (white powder, 20 nm, hydrophobic) may be provided by Green Stone Swiss Co. Ltd.

The present invention also contemplates multiple methods of application of the ink or film onto a final structure. A first method utilizes label presses or flexographic printing to complete the process with an optically clear base film. The first method includes numerous process steps, such as: printing the UAC (e.g., Tinuvin® CarboProtect®), printing a reflective UV ink, die cutting to a pattern, pulling a matrix inline to leave only dots on a web, and applying a clear transfer tape on top of the web to complete the process.

Similar to the first method, the second method utilizes label presses or flexographic printing to complete the process with an optically clear base film. However, distinct from the first method, in this second method, the base film is Polychrome™, which already contains a UV absorbing quality. As such, the second method does not require the addition of the UAC Tinuvin® CarboProtect®.

A third method includes: printing directly on glass or a film substrate using the UAC Tinuvin® CarboProtect® and the URC in an ABC approved matrix pattern. This method may occur by use of any handheld printers or drones equipped with printers to print directly on the glass.

Figure 2:
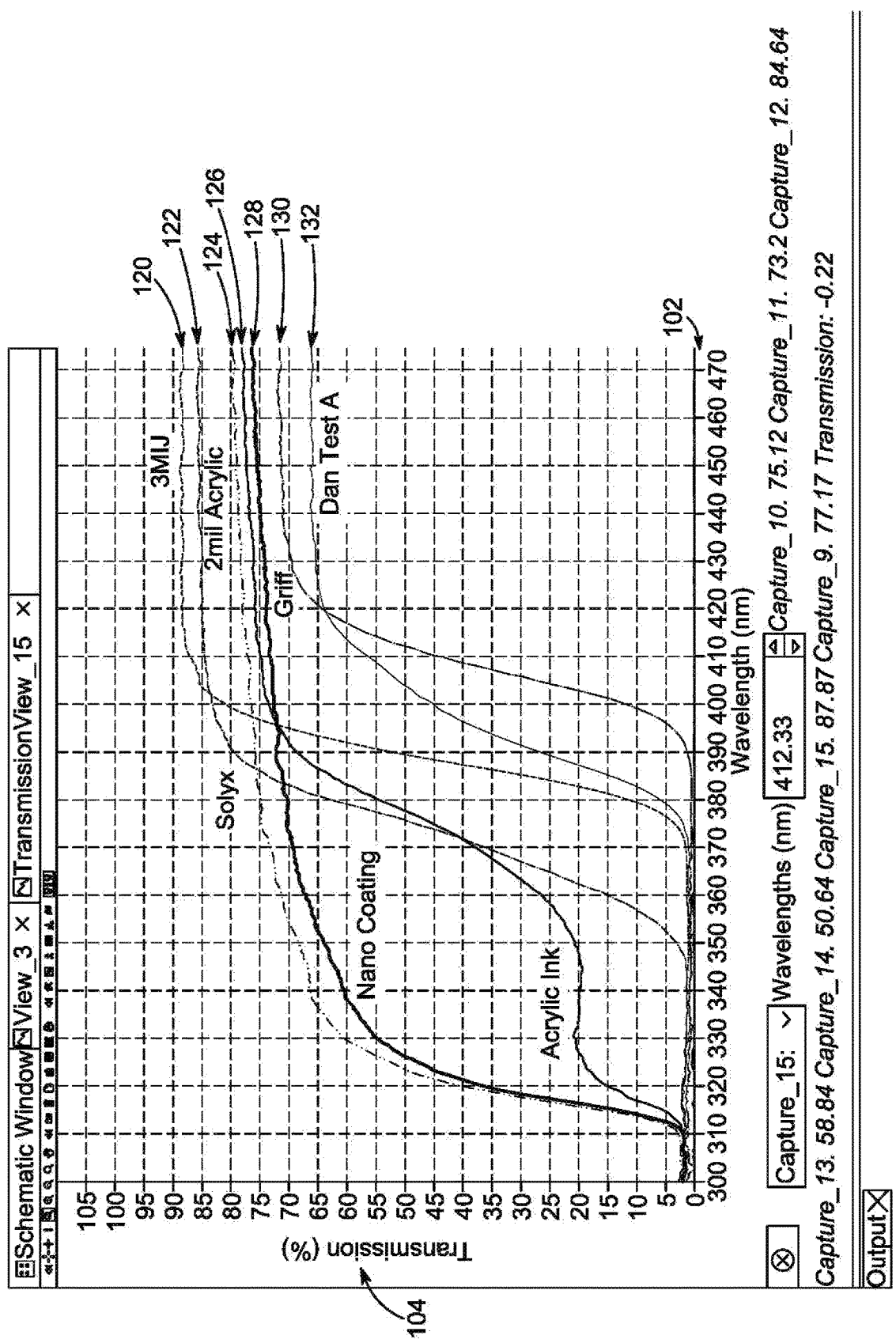
FIG. 2 depicts a graph resulting from a UV-VIS spectroscopy method that plots wavelength against transmission for various ink and film samples, in accordance with embodiments of the present invention.

UV-VIS spectroscopy (or spectrophotometry) is a quantitative technique used to measure how much a chemical substance absorbs light. This is done by measuring the intensity of light that passes through a sample with respect to the intensity of light through a reference sample or blank. FIG. 1 and FIG. 2 each depict spectrograph results.

For example, FIG. 1 includes an x-axis 102 associated with wavelengths measured in nm and a y-axis 104 associated with transmissions measured as percentages. Bare glass 106 and various dot samples 108, 110, 112, 114, 116, and 118 are depicted in FIG. 1. Further, FIG. 2 includes the x-axis 102 associated with wavelengths measured in nm and the y-axis 104 associated with transmissions measured as percentages. FIG. 2 depicts a 3M IJ ink sample 120, a 2 mil acrylic sample 122, a SOLYX® film sample 124, an acrylic ink sample 126, a nano-coating sample 128, a Griff window film sample 130, and a test sample 132. As shown in FIG. 2, the acrylic ink sample 126 looked darker or more absorbing in the 365 nm range and was darker than the 3M IJ ink sample 120. The acrylic ink sample 126 was more absorbing at about 385 nm. Further, these samples have success above 400 nm.

Figure 3A:
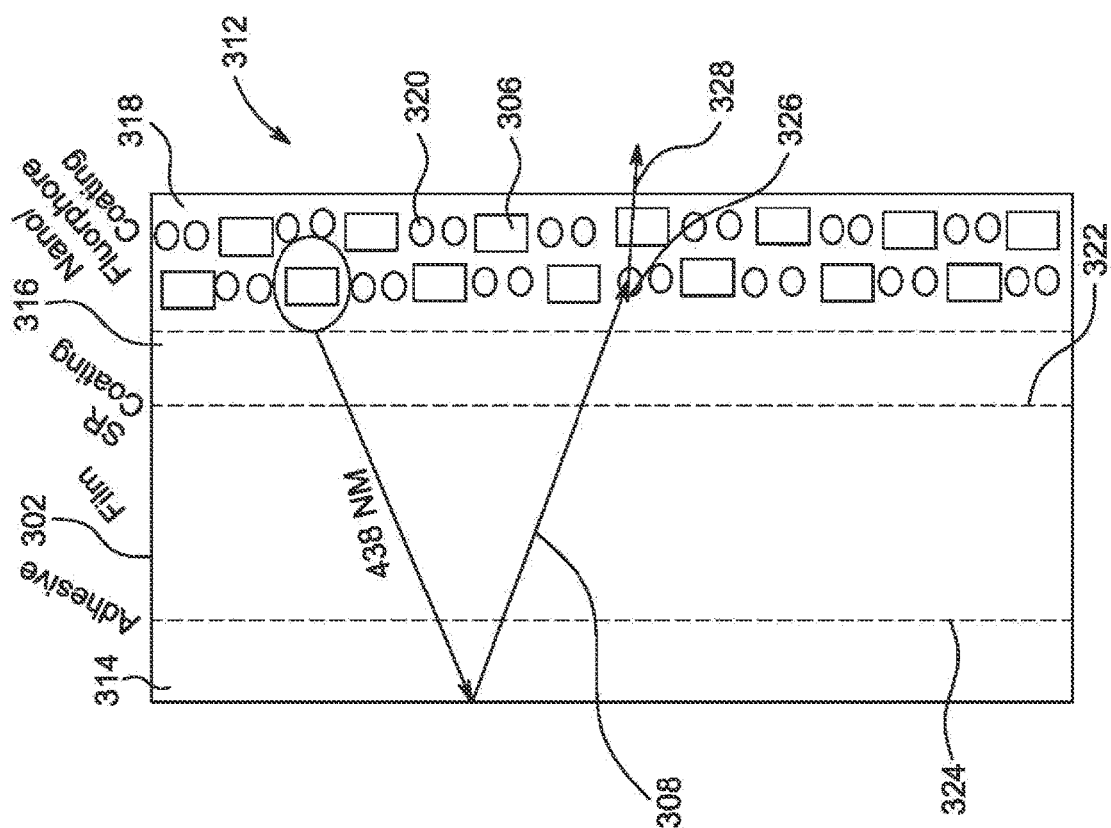
FIG. 3A depicts a side cut-away view of a film construction for a sample case resulting from UV light exposure, according to at least some embodiments disclosed herein.
Figure 3:
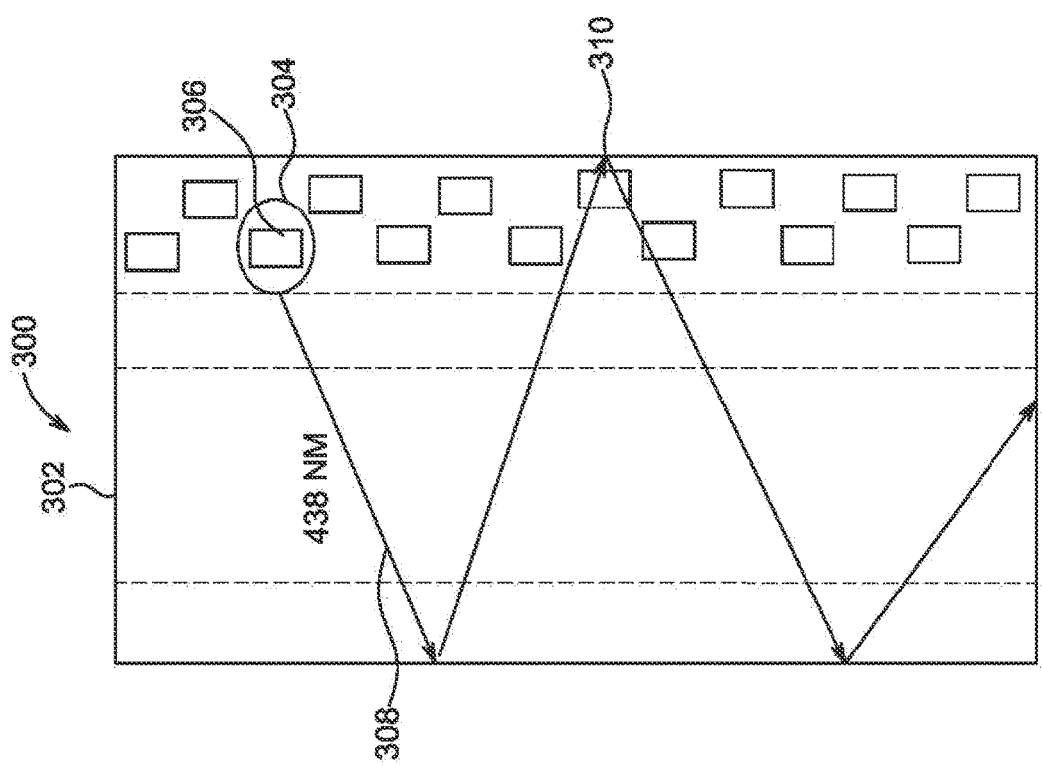
FIG. 3 depicts a side cut-away view of a film construction for a sample case, according to at least some embodiments disclosed herein.

FIG. 3 depicts film construction 300 for a sample case. Film 302 is shown without the 20 nm Hollow Nano Sphere. There is a need for a 20 nm Hollow Nano Sphere be applied on top surface of a film and/or dye. UV light 304 ranging from 300-400 nm excites perylene fluorophore 306 and at 308, creates 438 nm light. However, the light bounces between the Refractive Index and is primarily visible as a halo on edge 310 of the film.

FIG. 3A depicts an embodiment of film construction 312 for a sample case resulting from UV light exposure at Stage One 0-1 Years of Outdoor Exposure. Film 302 has adhesive 314 layer connected to one side of film 302. SR coating 316 overlays at least a portion of a surface of film 302. Nano/Fluorophore coating 318 overlays at least a portion of a surface of SR coating and/or film 302. Nano/Fluorophore coating 318 has plurality of fluorophores 306 and plurality of hollow nanospheres 320. UV light 304 ranging from 300-400 nm excites perylene fluorophore 306 and creates 438 nm light. With the presence of hollow nanospheres 320 the light will bounce between its refractive index until hitting, at 326, hollow nanosphere 320 and bending, at 328, some of light 308 in the opposite direction or primary surface 322 of film 302. Film 302 has primary surface 322 located opposite secondary surface 324. Primary surface 322 is located at the front side of film 302 while the secondary surface 324 is located at the rear of film 302.

Figure 3C:
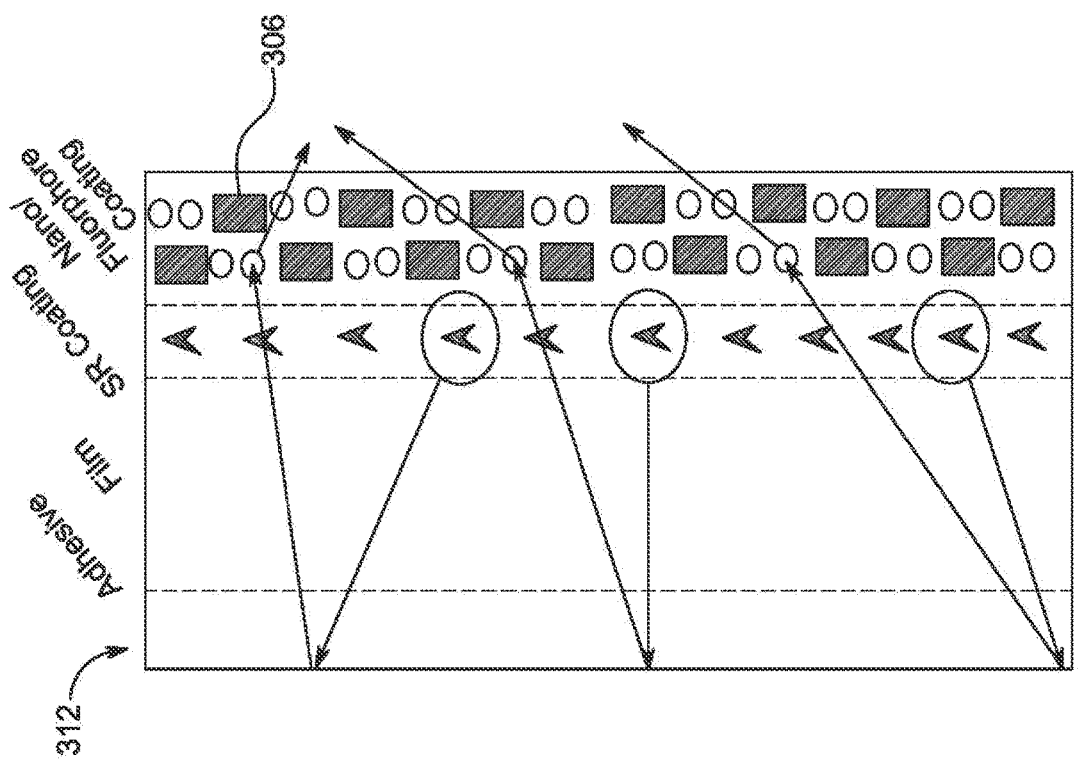
FIG. 3C depicts a side cut-away view of a film construction for a sample case resulting from UV light exposure, according to at least some embodiments disclosed herein.
Figure 3B:
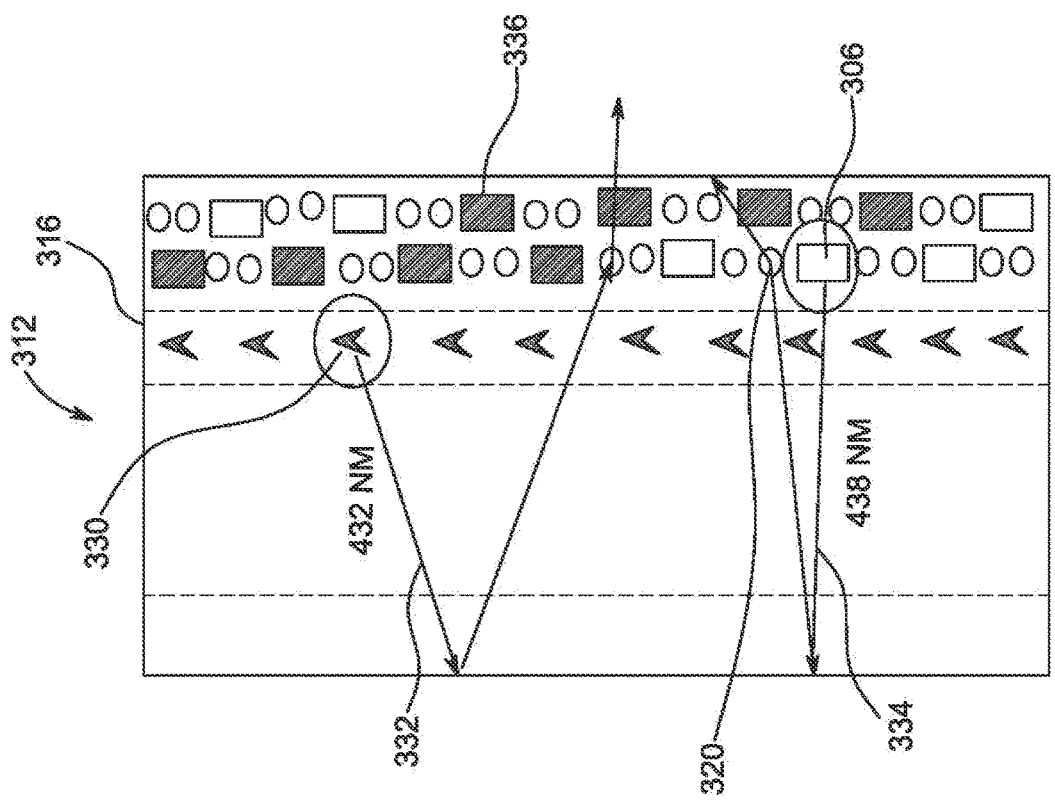
FIG. 3B depicts a side cut-away view of a film construction for a sample case resulting from UV light exposure, according to at least some embodiments disclosed herein.

FIG. 3B depicts film construction 312 of the embodiment of FIG. 3A for a sample case resulting from UV light exposure at Stage Two 1-3 Years of Outdoor Exposure. UV light ranging from 300-400 nm excites free radicals 330 in SR Coating 316 and creates 432 nm light at 332. The 432 nm light bounces between the Refractive Index and is more visible from the front. Further, UV light ranging from 300-400 nm excites perylene fluorophore 306 and creates 438 nm light at 334. With the presence of hollow nanosphere 320, the light will bounce between its refractive index until hitting the nano and bending some of the light in the opposite direction or front surface of the film. Some extinguished fluorophores 336 are present when SR Coating 316 has begun to phosphorescent as it breaks down after UV exposure.

FIG. 3C depicts film construction 312 of the embodiment of FIG. 3A a sample case resulting from UV light exposure at Stage Three 3-10 Years of Outdoor Exposure. UV light ranging from 300-400 nm excites free radicals in the SR Coating and creates 432 nm light. The 432 nm light bounces between the Refractive Index and is more visible from the front. At this point all of fluorophores 306 are completely extinguished and the breakdown of the phosphor in the SR Coating has completely taken over the role of light excite through phosphorescence.

Figure 4:
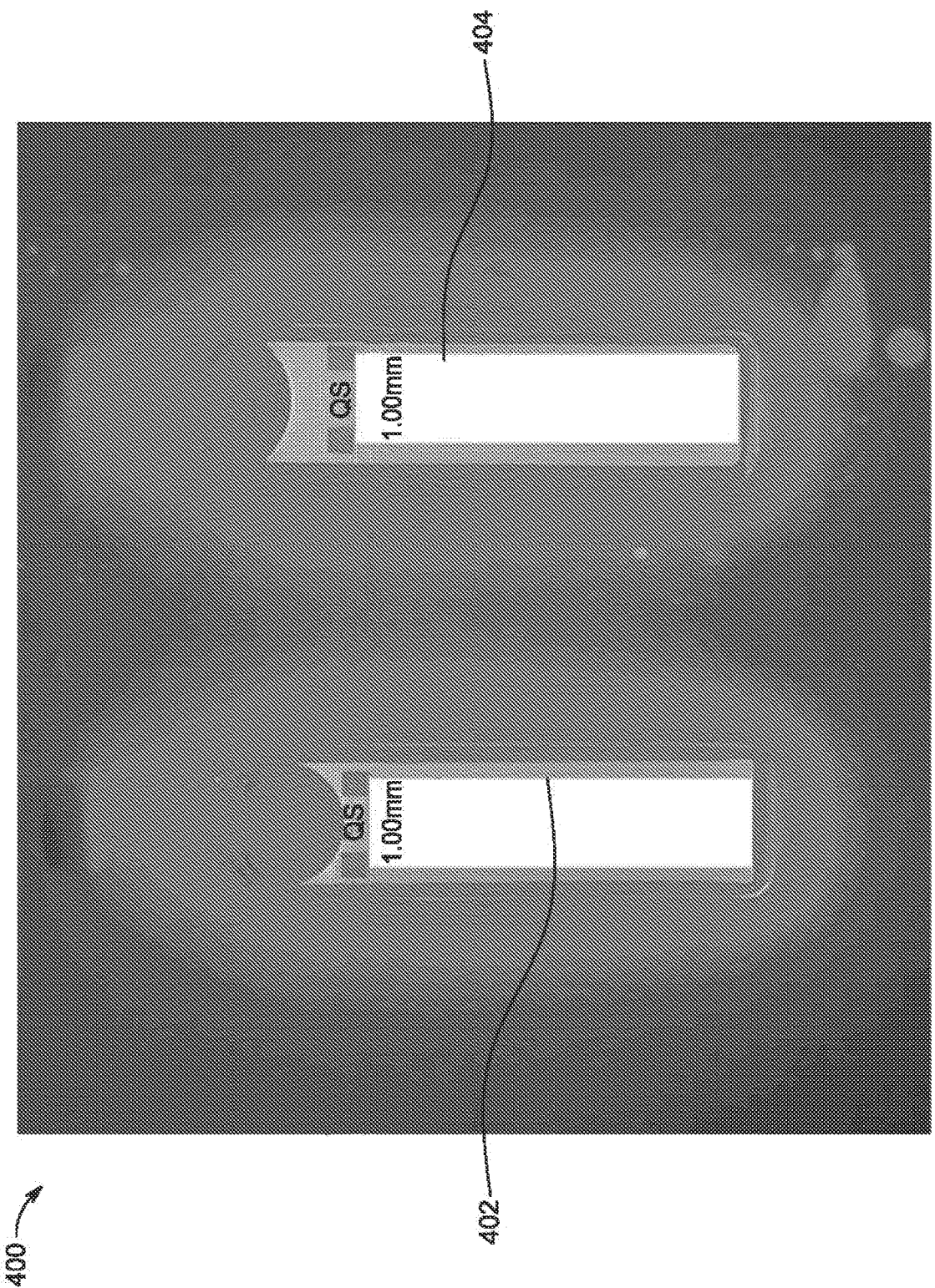
FIG. 4 depicts a perspective view of a comparison of results between film constructions for a sample case resulting from UV light exposure, according to at least some embodiments disclosed herein.

FIG. 4 depicts a perspective view of a comparison of results 400 between film constructions for a sample case resulting from UV light exposure. At 402, the film construction is without hollow nanospheres. At 404, the film exhibits a greater brightness due to the film coating having hollow nanospheres and fluorophores.

Figure 5:
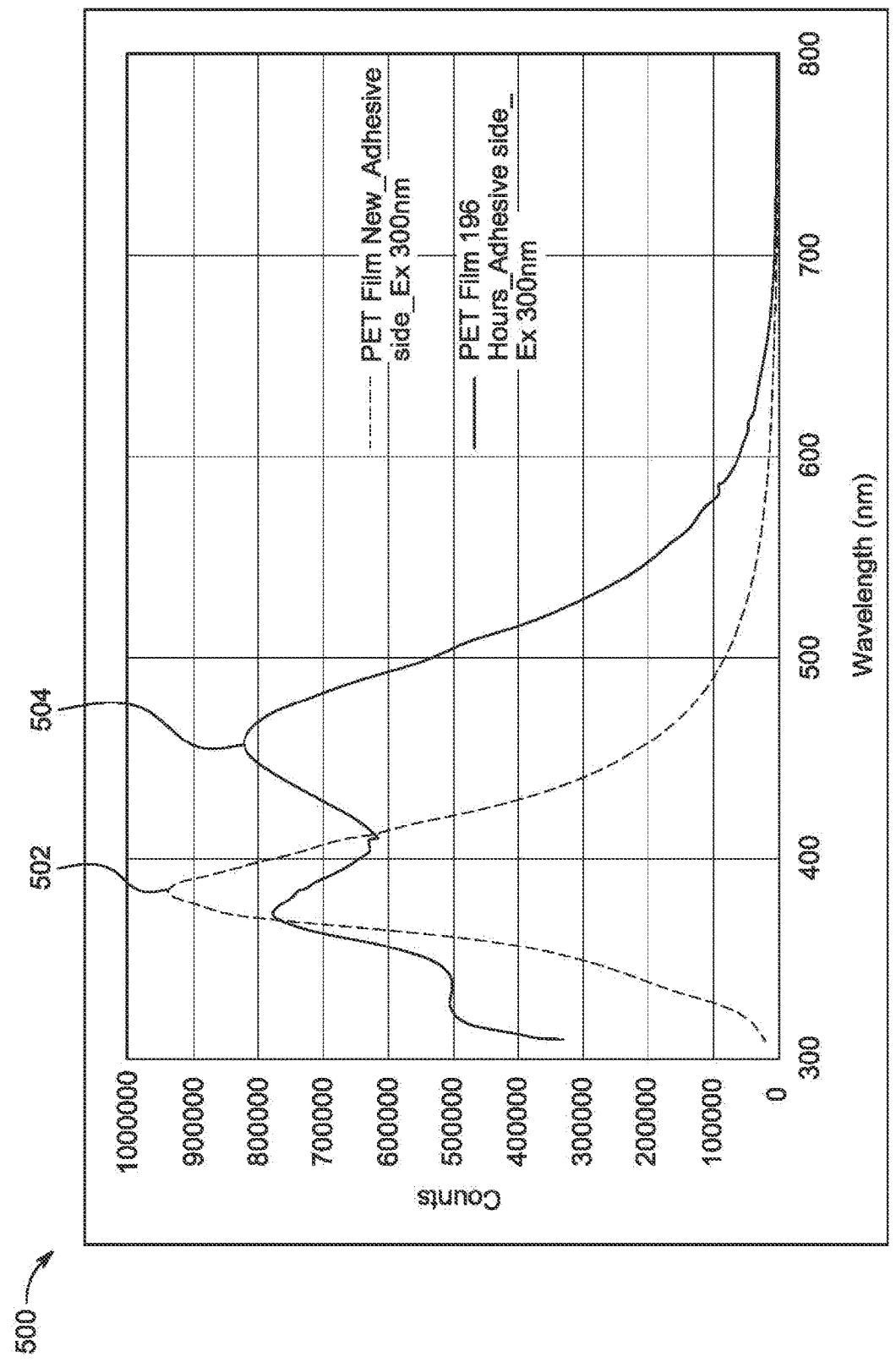
FIG. 5 depicts a graph of polyester film (PET) film properties, according to at least some embodiments disclosed herein.

FIG. 5 depicts graph 500 of polyester film (PET) film properties. At 502, PET film having a new adhesive side shows an emission peaking at approximately 370 nm. At 504, PET film having 196 hours adhesive side having an emission peaking at approximately 460 nm. The UV exposure creates chromophores and free radicals that change emission over time.

EXAMPLES

Example 1

A first example of the present invention includes a base film or ink that is optically clear but has a min of about 410 nm or above absorption at about 50% transmission, a matrix of absorbing and reflective dots or patterns that are separated by about 2 inches or less and are arranged in horizontal rows, vertical columns, both horizontal rows and vertical columns, or any other parallel arrangement of elements with similar spacing and variously angled from either or both the horizontal row and vertical column orientation, and an optically clear URC at about 350 nm and above.

Example 2

A second example of the present invention describes a UAC absorbing topcoat. The UAC absorbing topcoat includes a resin (such as a styrenated acrylic resin), an acetate ester (such as an ethyl acetate), and a UAC (such as a commercial UAC, Tinuvin® CarboProtect®). Specifically, the example of the UAC absorbing topcoat includes about 30 parts of the resin, about 70 parts of the acetate ester and about 7.8 parts of the UAC. This example UAC absorbing topcoat may be coated onto a polyester film with a 6.0 Mayer rod and may be dried for a time period of about 2 minutes at a temperature of about 55 degrees Celsius. The UAC absorbing topcoat may appear visually clear, with a very slight yellow color. About 50% light transmission occurs at about 428 nm.

Example 3

A third example of the present invention describes a URC reflective topcoat. The URC reflective topcoat includes a polyurethane dispersion (e.g., Quaker AB90F aliphatic polyurethane dispersion (35% solids)), a nanometer silicon oxide, and a silicone surfactant (e.g., Byk 348). Specifically, the URC reflective topcoat includes about 100 parts of the polyurethane dispersion, about 0.18 parts of the nanometer silicon oxide, and about 0.18 parts of the silicone surfactant. The URC reflective topcoat may be coated onto a polyester film with a 2.5 Mayer rod and may be dried for a time period of about 2 minutes at a temperature of about 55 degrees Celsius. The URC reflective topcoat may appear visually clear, with a water-white color. About 80% UV reflectivity occurs between the wavelength range of about 310 to about 400.

Additional Description

UV absorbing dyes and/or films and hollow silica oxide nano-infused fluorescent dyes/films for anti-bird collisions and invisible inks are described. The base layer of any film and/or dye may consist of a minimum of 50% absorbing/transmission rate above 400 nm to 430 nm without changing the optical clarity of the film. At 114, FIG. 1 shows that it is preferable with a very sharp spike from absorbing 100% at 400 nm to the transmission of 100% at 430 nm.

The next layers must consist of three components that may be incorporated into the base as a whole or applied in one coating and/or at least stacked and/or layered on top of the absorbing dyes and/or films in any order or may be used effectively without the absorbing layers also. They all must have substantially 100% optical clarity also.

The first component is a hollow silicon oxide of 20 nm in size. This component breaks up the refractive index of the coating but is optically clear and cannot be seen by humans. This forces the fluorescent light to equal surfaces of the coating rather than bouncing between the refractive index and exiting the side. It is more desirable to achieve as much light as possible to escape the front viewing surface of the film/coating.

The second component includes, but is not limited to, any fluorophore that emits light in the range of 350 nm to 800 nm with at least 500,000 counts in brightness and above; will last being exposed to at least 750kj of UV exposure and still be fluorescent; and meet the values stated above. It is within the scope of this invention for a fluorescent dye to include, but not be limited to, Excilite 531, 490, and/or 432.

The third component consists of a SR coating such as, any commercially available SR coating. Any commercially available SR coating may have a counts brightness above 500,000; a light emission from 350 nm to 800 nm after it's been exposed to a min 750 kj of UV emission; and will stay fluorescent to 100,000 kj of exposure. As the SR component breaks down, it changes from 0% fluorescent to very fluorescent after UV exposure. It is within the scope of this invention for the SR coating as a whole to be present as an element and/or chemical in both SR coatings and silicone release liners due to free radicals in the presence of UV light. The SR coating has a peak emission of 461 nm and a counts of 800,000, which is ideal.

In an aspect, components 2 and 3 can be used to create an invisible ink that can last outdoors in full sunlight for 10 plus years. This combination of components 2 and 3 serve as an improvement compared to the standard 3 month lifespan timeline of an invisible ink.

In another aspect, components 1, 2, and 3 and/or components 1 and 2 can be used to coat for example, wind turbines to avoid bird impacts using drones and/or helicopters to spray on the clear coating. This is an ideal solution because windmills cannot deviate from their standard color scheme by law according to some governing organizations such as the Federal Aviation Administration (FAA).

In another aspect, components 1 and 2 are the most effective but need to be replaced about yearly.

In another aspect, components 1, 2, and 3 last up to ten years but are not as effective after year 1.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A formulation applied to a transparent or clear surface that is visible to avian eyes but invisible to human eyes at a distance of at least ten feet, the formulation comprising: a binder; a carrier; a base configured to dissolve and solubilize the binder such that it can be applied to the carrier; and at least one of an ultraviolet (UV)/visible (VIS) absorbing (UAC) component or a UV/VIS reflective (URC) component, wherein the formulation further comprises a crosslinking component.

2. The formulation of claim 1, wherein the binder is selected from the group consisting of: an acrylic, a polyurethane, a polyester, a polyether, a silicone, a fluoropolymer, a polyisobutylene (PIB), an ethylene vinyl acetate (EVA), an ethylene acrylic acid (EAA), a natural rubber, and a synthetic rubber.

3. The formulation of claim 1, wherein the base is selected from the group consisting of: a monomer, a solvent, a solid system, a solventless system, and an aqueous system.

4. The formulation of claim 1, wherein the carrier contributes to at least one of optical quality, UV light transmission, VIS light transmission, and a physical appearance of the formulation on the transparent or clear surface.

5. The formulation of claim 1, wherein the carrier is a substrate; and wherein the substrate is selected from the group consisting of: an acetate, an acrylic, a polyvinyl chloride (PVC), a polyester, and a polyurethane film.

6. The formulation of claim 1, further comprising: at least one additive component.

7. The formulation of claim 6, wherein the at least one additive component is selected from the group consisting of: a wetting aid, a defoamer, a rheology modifier, a humectant, a plasticizer, a tackifier, a filler, a pigment, a dye, a matting agent, an inhibitor, and a stabilizer.

8. The formulation of claim 6, wherein the binder is configured to hold the at least one additive component in place.

9. The formulation of claim 1, wherein the crosslinking component is selected from the group consisting of: a peroxide, an azo, an aziridine, an isocyanate, a polyol, a thiol, a titanate, a zirconate, a metal oxide, and a metal acetylacetonate.

10. The formulation of claim 1, wherein the formulation is applied to a transparent or clear surface by a method selected from the group consisting of: a gravure method, an offset-gravure method, an enclosed doctor blade method, a multi-roll method, a dip method, a spray method, a Mayer rod method, and a knife over roll method.

11. The formulation of claim 1, wherein the UAC component comprises an organic component, an inorganic component, or a blend of organic and inorganic components.

12. The formulation of claim 11, wherein the UAC component provides absorption in a range of about 400 nm to about 450 nm.

13. The formulation of claim 11, wherein the UAC component is selected from the group consisting of: metal oxides, metal nanoparticles, organic nanoparticles, organometallic nanoparticles, benzotriazoles, triazines, benzophenones, hindered amine light stabilizers (HALS), primary antioxidants, dyes, and metal complex absorbing dyes.

14. The formulation of claim 1, wherein the URC component comprises nanoparticles having a size in a range of about 0.50 nm to about 1000 nm.

15. The formulation of claim 1, wherein the formulation further comprises a base film or ink, wherein the base film or the ink comprises a minimal absorbance at a wavelength of 430 nm or above and about 50% transmission at a wavelength of 410 nm.

16. The formulation of claim 1, wherein the transparent or clear surface is a window.

* * * * *